United States Patent [19]
Osterhagen et al.

[11] 3,806,301

[45] Apr. 23, 1974

[54] APPARATUS FOR FORMING TUBE END SOCKETS

[75] Inventors: Gerhard Osterhagen, Driesch; Friedhelm Krebsbach; Waldemar Wissinger, both of Siegburg, all of Germany

[73] Assignee: Dynamit Nobel AG, Troisdorf, Germany

[22] Filed: Mar. 2, 1971

[21] Appl. No.: 120,341

Related U.S. Application Data
[62] Division of Ser. No. 868,180, Oct. 21, 1969, Pat. No. 3,632,732.

[30] Foreign Application Priority Data
Nov. 9, 1968 Germany.......................... 1808110

[52] U.S. Cl................................. 425/393, 425/384
[51] Int. Cl............................................. B29c 17/00
[58] Field of Search .......... 425/384, 388, 406, 108, 425/DIG. 60, 112, 393, 289, 292, 398, 412

[56] References Cited
UNITED STATES PATENTS

| | | | |
|---|---|---|---|
| 3,205,535 | 9/1965 | Niessner et al. ................ | 425/393 X |
| 3,553,780 | 1/1971 | Kuhlemann......................... | 425/384 |
| 2,943,349 | 7/1960 | Adams et al........................ | 425/292 |
| 3,425,883 | 2/1969 | Smith................................ | 425/123 |

Primary Examiner—Robert L. Spicer, Jr.
Attorney, Agent, or Firm—Craig & Antonelli

[57] ABSTRACT

A process for forming, at the end of a pipe fabricated from a synthetic resin material, a socket having external ribs, beads, projections, or the like, extending in cross-sectional planes or helically, and apparatus for implementing the novel process, wherein the process contemplates the insertion of a temperature-controlled mandrel in the end of an initially-heated pipe, simultaneously imparting a rotary motion to the mandrel as it is axially advanced and, upon cooling of the pipe end, withdrawal of the mandrel with further rotary motion thereof.

5 Claims, 1 Drawing Figure

PATENTED APR 23 1974 3,806,301
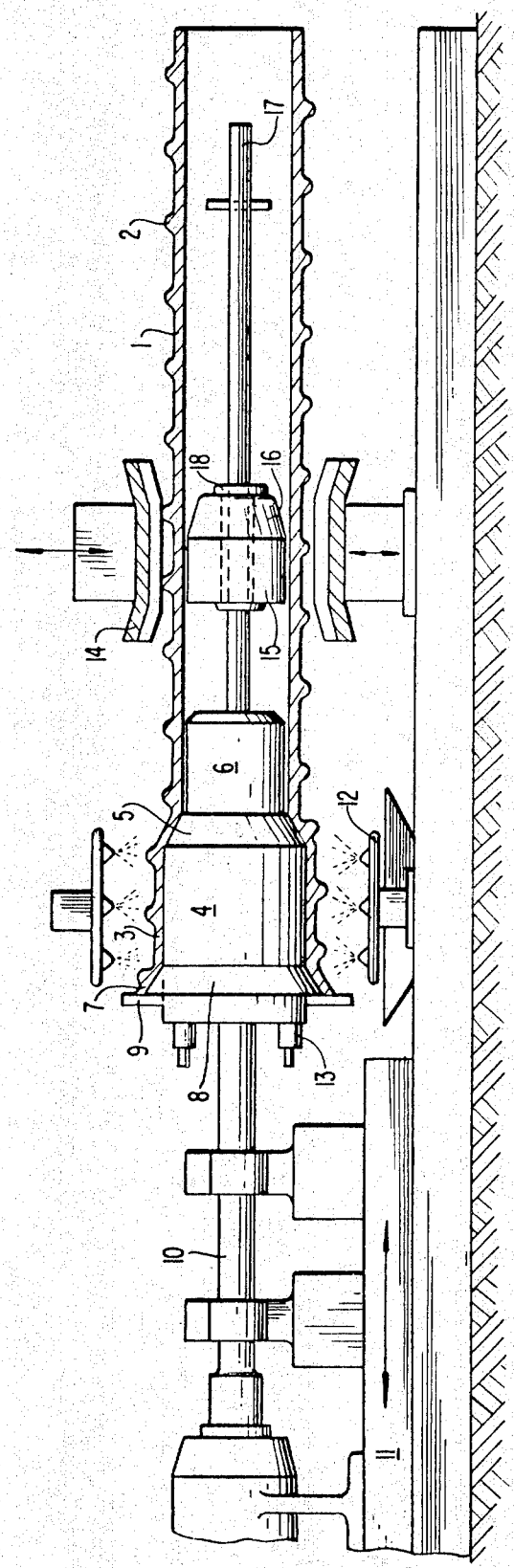

3,806,301

APPARATUS FOR FORMING TUBE END SOCKETS

This application is a divisional application of Ser. No. 868,180, filed Oct. 21, 1969, now U.S. Pat. No. 3,632,732.

BACKGROUND OF THE INVENTION

Conventionally, the processes employed for forming sockets on smooth pipes, i.e., pipes having a constant wall thickness, have generally included heating the end of the pipe and then forcing same over an expanding mandrel corresponding, in its outer dimensions, to the internal dimensions of the socket to be formed and provided with smooth external surfaces. Methods of this type, however, cannot be employed for producing sockets on pipes fabricated from synthetic resin materials, which pipes include external ribs, beads, projections, or the like, primarily because the sections of pipe disposed between the beads, which sections exhibit a thickness substantially less than that of the beads themselves, would be compressed, with the resulting formation of wrinkles, creases, or folds. Moreover, the known processes whereby the end of the pipe on which the socket is to be formed is pulled over the mandrel, as well as those attempts to preclude the formation of undesirable wrinkles by providing external support, has not afforded the results desired.

It has also been suggested that sockets of the type described hereinabove could be successfully formed by the use of an expanding mandrel composed of a plurality of separable segments. These efforts have been similarly unsuccessful and are, moreover, extremely expensive and complex in operation.

Accordingly, it is an object of the present invention to provide a novel method and apparatus for producing sockets with external ribs, beads, projections or the like on the ends of pipe fabricated from a synthetic resin material, which sockets are generally free from undesirable wrinkles or creases in the sections between the beads.

Further, it is an objective of the present invention to provide a method and apparatus which effectively eliminate the disadvantages inherent in the conventional processes and apparatus for performing a similar function.

Moreover, it is an objective of the present invention to provide a method and apparatus for forming sockets having external ribs, beads, or the like on the ends of pipes fabricated from a synthetic resin material, which process and apparatus is relatively simple and inexpensive, both from the standpoint of the production of the apparatus required and the operation thereof.

SUMMARY OF THE INVENTION

The aforementioned objectives are accomplished, in accordance with the present invention, by providing a temperature-controlled mandrel which has an external configuration corresponding to that of the inner contour of the socket to be formed and by introducing the mandrel into the end of the pipe, which has been initially heated, imparting a rotational motion to the mandrel as it is advanced in the axial direction of the pipe. When the mandrel has been advanced to the full extent of its axial displacement, the rotary motion thereof is terminated; thereafter the pipe end is cooled internally and/or externally and the mandrel is withdrawn from the formed socket again having a rotary motion imparted thereto.

In accordance with one embodiment of the present invention, wherein a socket is formed having helically extending ribs, beads, or the like the rotary motion of the mandrel is in the direction of the pitch of the helical beads, as viewed from the mandrel side of the socket.

The novel process according to the present invention can be employed for cylindrical as well as conical expanding operations. By way of example, the novel process according to the present invention produced flawless sockets formed on PVC pipes having an internal diameter of 500 mm., wall thicknesses of 5 and 6 mm., as well as external ribs having a height of 15 and 20 mm., extending helically at pitch of about 100 mm., utilizing peripheral mandrel speeds in the range of 40–80 m./min. The temperatures of the mandrel ranged between about 75° to 90°C.; in this regard, it was found to be advantageous to utilize a mandrel heated to a temperature higher than that corresponding to the softening point of the material.

The novel apparatus contemplated by the present invention includes an expanding mandrel which, when viewed from the end of the pipe to be expanded, exhibits, successively, a cylindrical guide member having a cross-sectional dimension slightly smaller than the internal diameter of the pipe, and, adacent thereto, a section having a larger cross-sectional dimension, corresponding to the internal cross-sectional dimensions of the socket to be formed. The guide member serves to insure an accurate centering of the mandrel and, additionally, to prevent the creation of wrinkles in the heated, but as yet unexpanded, pipe section. The length of the guide member, which normally need not be temperature-controlled, depends upon the dimensional configuration of the socket to be formed.

At least one cutting blade is provided for the purpose of trimming the edge of the socket simultaneously with the forming thereof. The cutting blade, which may be provided at the end of the mandrel opposite the pipe or on a ring mounted adjustably upon the mandrel, projects outwardly beyond the mandrel or ring to such an extent as to insure a clean trimming of the front face of the formed socket. It is also within the contemplation of the present invention to provide a plurality of cutting blades, in which case these would advantageously be distributed, at equal spacing, over the circumference.

In order to securely fix the more or less elastic and flexible pipes, fabricated from synthetic resin material, with respect to the relatively high torques generated by the rotating expanding mandrel, the mandrel, according to the present invention, may be constructed with a central, axial, rod-shaped cylindrical extension at the end thereof facing the pipe end and a supporting mandrel may be disposed on this extension, displaceable and rotatable with respect to the extension and adapted to the internal diameter of the pipe to be expanded. Thus, it is possible to apply the pressure necessary for securing and retaining the pipe, by means of the customary, external clamping devices, while precluding the formation of an undesired depression in the pipe. On the other hand, the displaceability and rotatability of the expanding mandrel is not inhibited by the contemplated support arrangement.

BRIEF DESCRIPTION OF THE DRAWING

The aforementioned objectives, features and advantages of the present invention will become more readily apparent from a consideration of the detailed description hereinbelow, when considered in conjunction with the accompanying drawing, diagrammatically illustrating one embodiment of the invention.

DETAILED DESCRIPTION OF THE DRAWING

According to the illustrated embodiment, a pipe 1, fabricated from a synthetic resin material, includes external reinforcing ribs 2 extending thereabout in a helical fashion. The pipe 1 is widened at its end to form the socket 3. An expanding mandrel 4, which is capable of being heated and/or cooled by way of the connecting members 13, includes a conical section 5 and a guide member 6 which, according to the illustrated embodiment, is cylindrical in configuration. The end 7 of the socket 3 is conically widened by means of the terminal ring 8 disposed on the mandrel 4, for example, to facilitate the introduction of another pipe section (not shown) into the formed socket 3 of pipe 1. Cutting blades 9 are affixed upon the ring 8 for purposes of trimming the rim of the socket 3 or 4 leveling the front face thereof.

The expanding mandrel 4 is coupled with a shaft 10 which is driven by means of a drive mechanism (not shown), which driven shaft 10 imparts a rotary motion to mandrel 4. The drive mechanism (not shown), the shaft 10 and, therefore, the mandrel 4 are disposed upon a slide 11, thereby facilitating reciprocation thereof in the axial direction of the pipe 1, as indicated by the double arrow extending the direction of the pipe axis.

External spray units 12 are provided for the purpose of cooling the socket 3 after it has been formed. The pipe 1 is secured in its position by means of clamping jaws 14. In the interior of pipe 1 in the region of the clamping jaws 14, a supporting mandrel 15 is provided, supported upon an extension 17 of the mandrel 4. The extension 17 serves to loosely guide and support the supporting mandrel 15 for rotation and displacement relative thereto. Supporting mandrel 15 includes a conical section 16 to facilitate insertion thereof into the end of pipe 1.

Element 18, illustrated schematically in the drawing, serves to fix the position of supporting mandrel 15 relative to the extension 17 prior to the beginning of the forming operation such that when the supporting mandrel 15 is inserted into the pipe 1, it is fixed in position therein and released upon the onset of the rotary motion of mandrel 4.

The socket-forming operation, contemplated by the illustrated embodiment, proceeds as follows: with the expanding mandrel 4 retracted toward the left-hand position, as viewed in the drawing, the pipe 1 is placed in position between the clamping jaws 14. The supporting mandrel 15 in this position, is disposed between the clamping jaws 14 on the right-hand end of the extension 17 and is retained in position by means of the blocking means 18. The mandrel 4 is then heated and is adjusted to the desired operating temperature. In the same manner, the end of the pipe 1 is heated by means of the heating unit 12.

By means of the drive mechanism (not shown), the shaft 10 and, accordingly, the mandrel 4, are set into rotary motion; the blocking member 18 is automatically released. The rotating mandrel 4 is now inserted into the heated end of the pipe 1 and the pipe end is appropriately expanded.

After the termination of the expanding step, i.e., when the mandrel 4 has arrived at its right-hand terminal position, the rotary motion of the mandrel 4 is terminated. The expanded pipe end 3 is then cooled by switching the mandrel 4 from a heating mode to a cooling mode by means of the connecting members 13. The operating medium for the heating and cooling device may be hot and cold water, or, as an alternative, steam and cold water. In order to increase the cooling rate, the socket 3 can be cooled additionally with air or water by means of the device 12.

After the socket 3 has been cooled sufficiently, the mandrel 4 is again set into rotary motion and is withdrawn from the socket 3; the pipe 1 is removed from the clamping jaws 14 and a new pipe 1 is secured therein for a subsequent operation.

While the present invention has been disclosed with reference to the specific details of but a single embodiment, it is to be understood that the scope of the invention is not limited to the specific details illustrated, but is susceptible to numerous changes and modifications as would be apparent to one with normal skill in the pertinent technology.

What is claimed is:

1. Apparatus for forming a socket at an end of a pipe fabricated from thermoplastic synthetic resin material and having external ribs, beads, or the like extending thereabout in cross-sectional planes or helically, comprising:

expanding mandrel means, a supporting mandrel means and means for supporting said mandrel means for reciprocal motion in the axial direction of said pipe and for rotary motion about the longitudinal axis of said pipe, said expanding mandrel means including a guide member having an external dimension slighly smaller than the internal cross-sectional dimension of said pipe and a forming member arranged axially behind said guide member, said forming member having an external configuration corresponding to the desired internal configuration of the socket to be formed in the end of said pipe, means operatively associated with said supporting mandrel means for securing said pipe in a fixed position relative to said mandrel means, drive means for selectively reciprocating said mandrel means in the axial direction of said pipe whereby said mandrel means can be inserted into and removed from said pipe and for selectively imparting rotary motion to said mandrel means during insertion into and removal from said pipe, and means for selectively controlling the temperature of said mandrel means.

2. Apparatus according to claim 1, wherein said guide member has a substantially cylindrical configuration and wherein said mandrel means further includes a generally conical transition section disposed between said guide member and said forming member.

3. Apparatus according to claim 1, further comprising edge trimming means for cutting said pipe including at least one cutting block means supported upon said mandrel means and projecting outwardly therefrom to an extent exceeding the largest radial dimension thereof.

4. Apparatus for forming a socket at an end of a pipe fabricated from thermoplastic synthetic resin material and having external projections extending therefrom comprising:

expanding mandrel means, a supporting mandrel means and means for supporting said mandrel means for reciprocal motion in the axial direction of said pipe and for rotary motion about the longitudinal axis of said pipe, said expanding mandrel means including a guide member having an external dimension slightly smaller than the interal cross-sectional dimension of said pipe and a forming member arranged axially behind said guide member, said forming member having an external configuration corresponding to the desired internal configuration of the socket to be formed in the end of said pipe, means operatively associated with said supporting mandrel means for securing said pipe in a fixed position relative to said mandrel means said means for securing said pipe in a fixed position relative to said mandrel means includes the mandrel means having in advance of said guide member, a central, axial, rod-shaped, cylindrical extension, said supporting mandrel being disposed on said cylindrical extension for axial displacement and rotation relative to said cylindrical extension, said supporting mandrel having an external configuration corresponding substantially to the internal configuration of said pipe, and blocking means for selectively fixing said supporting mandrel relative to said extension and clamping means external of said pipe in an axial position corresponding to the relative position of said supporting mandrel, for applying pressure to said pipe thereby securing said pipe in said fixed position between said supporting mandrel and said clamping means, and drive means for selectively reciprocating said mandrel means in the axial direction of said pipe whereby said mandrel means can be inserted into and removed from said pipe and for selectively imparting rotary motion to said mandrel means during insertion into and removal from said pipe.

5. An apparatus according to claim 1, wherein said means for selectively controlling the temperature of said mandrel means includes means for heating said mandrel means prior to insertion of said mandrel means into said pipe and means for cooling said mandrel means prior to removal of said mandrel means from said pipe.

* * * * *